United States Patent
Pope et al.

(10) Patent No.: US 10,942,765 B2
(45) Date of Patent: Mar. 9, 2021

(54) AUTOMATED MONITORING AND AUDITING FAILED AND RECOVERED BATCH DATA TASKS

(71) Applicant: MASTERCARD INTERNATIONAL INCORPORATED, Purchase, NY (US)

(72) Inventors: Michael J. Pope, Florissant, MO (US); Rakesh Awasthi, Lake St Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 75 days.

(21) Appl. No.: 16/248,522

(22) Filed: Jan. 15, 2019

(65) Prior Publication Data

US 2020/0226037 A1    Jul. 16, 2020

(51) Int. Cl.
| | |
|---|---|
| *G06F 9/46* | (2006.01) |
| *G06F 9/48* | (2006.01) |
| *G06F 11/14* | (2006.01) |
| *G06F 16/25* | (2019.01) |
| *G06F 16/20* | (2019.01) |

(52) U.S. Cl.
CPC ............... *G06F 9/466* (2013.01); *G06F 9/46* (2013.01); *G06F 9/48* (2013.01); *G06F 9/485* (2013.01); *G06F 9/4843* (2013.01); *G06F 11/14* (2013.01); *G06F 11/1474* (2013.01); *G06F 16/20* (2019.01); *G06F 16/254* (2019.01); *G06F 2201/87* (2013.01)

(58) Field of Classification Search
CPC ... G06F 9/46; G06F 9/466; G06F 9/48; G06F 9/4843; G06F 9/485; G06F 11/14; G06F 11/1474; G06F 16/20
See application file for complete search history.

(56) References Cited

U.S. PATENT DOCUMENTS

| | | | |
|---|---|---|---|
| 7,941,397 B2 | 5/2011 | Wilms et al. | |
| 9,189,356 B2 | 11/2015 | Iyer et al. | |
| 9,971,655 B1* | 5/2018 | Li | G06F 11/1438 |
| 2004/0199517 A1* | 10/2004 | Casati | G06F 16/283 |
| 2006/0047992 A1* | 3/2006 | Gerard | G06F 11/3466 |
| | | | 714/1 |

(Continued)

*Primary Examiner* — Charles M Swift

(57) ABSTRACT

The disclosure herein describes automatically monitoring and auditing the performance of batch data tasks associated with a data warehouse. A failure status indicator associated with a batch data task is detected in a task status log associated with the data warehouse. Based on detecting the failure status indicator, the task status log is polled for a recovery status indicator associated with the batch data task. Based on detecting the recovery status indicator associated with the batch data task, audit programs associated with the batch data task are initiated and audit results is received therefrom. Based on the received audit results, an audit result indicator is provided, the audit result indicator including an audit success indicator or an audit failure indicator. The described system provides efficient auditing feedback regarding failed batch data tasks to responsible parties associated with those tasks, enabling efficient detection of and response to potential data errors.

20 Claims, 5 Drawing Sheets

(56) References Cited

U.S. PATENT DOCUMENTS

| | | | |
|---|---|---|---|
| 2011/0060950 A1* | 3/2011 | Waldron | G06F 11/1451 714/48 |
| 2012/0167099 A1* | 6/2012 | Kajita | G06F 9/45512 718/101 |
| 2014/0068621 A1* | 3/2014 | Sitaraman | G06F 9/505 718/102 |
| 2014/0229628 A1* | 8/2014 | Mandal | G06F 16/24568 709/231 |
| 2014/0304553 A1* | 10/2014 | Gondi | G06F 11/3075 714/39 |
| 2017/0208547 A1* | 7/2017 | Choi | H04B 7/0452 |
| 2017/0235596 A1* | 8/2017 | Vankadaru | G06F 9/45558 718/1 |
| 2018/0337770 A1* | 11/2018 | Bathen | H04L 9/3239 |
| 2018/0357088 A1* | 12/2018 | Inbaraj | G06F 9/542 |
| 2019/0205162 A1* | 7/2019 | Kalajan | G06F 9/4881 |

\* cited by examiner ic # AUTOMATED MONITORING AND AUDITING FAILED AND RECOVERED BATCH DATA TASKS

BACKGROUND

Modern data warehouses store large quantities of data in many different data tables, files, or other data structures. Further, a data warehouse may include multiple types of data storage (e.g., ORACLE, NETEZZA, HADOOP, etc.). Data warehouses are typically maintained using automated data processing tasks that are performed in batches, called batch tasks or batch data tasks. Batch data tasks may be configured to extract, load, transform, and/or generate data in various data locations of the data warehouse and the operations of the batch data tasks may be dependent on input data from within, or outside of, the data warehouse. Manual maintenance of a typical data warehouse is virtually impossible due to the sheer quantity and variety of the data in the data warehouse, making batch data tasks essential for effective data warehouse management.

However, batch data tasks may fail during execution, causing some or all of the associated data operations to be incomplete or performed incorrectly. Recovery from a failed batch data task may include manual operations that roll back changes made by the batch data task, repeat changes made by the batch data task, correct changes made by the batch data task, and/or complete changes made by the batch data task. It is challenging to perform perfectly accurate manual recovery operations, and the result of inaccurate operations may be partial data loads, repeated or double data loads, corrupted data loads, etc. Such recovery errors may go undetected for a period of time and affect the accuracy and consistency of large quantities of data in the data warehouse as corrupted or incomplete data sets are used in subsequent data processing. Additional, effort-intensive recovery operations are then required to restore the state of the data warehouse.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method and system for monitoring and auditing failed and recovered batch data tasks is described. A failure status indicator associated with a batch data task is detected in a task status log associated with a data warehouse. Based on detecting the failure status indicator, the task status log is polled for a recovery status indicator associated with the batch data task. Based on detecting the recovery status indicator associated with the batch data task, at least one audit program associated with the batch data task is initiated and at least one audit result is received therefrom. Based on the received at least one audit result, at least one audit result indicator is provided, the at least one audit result indicator including at least one of an audit success indicator indicating that a recovery of the batch data task has succeeded and an audit failure indicator indicating that the recovery of the batch data task has failed.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Aspects of the disclosure provide a system and method for monitoring batch data task statuses and automatically auditing the performance of batch data tasks that have recovered from failure. During the performance of batch data tasks, a failure status indicator of a failed batch data task is written to a task status log. The failure status indicator is detected in the task status log by an audit engine as described herein. The audit engine polls the task status log for a recovery status indicator associated with the batch data task. When the recovery status indicator is detected, audit programs associated with the batch data task are initiated and audit results are received therefrom. The audit results indicate success or failure of the recovery of the failed batch data task. The audit engine provides the audit results and/or indicators thereof for use by other components of the system and/or by users of the system.

The described batch data task auditing system provides automated validation of batch data task recovery processes and timely notification to users regarding the validation. With such notifications, responsible parties of the recovered batch data tasks or other users are enabled to rapidly respond to any data corruption or other issues that arise as a result of the recovery, reducing the likelihood that corruption of the data spreads throughout the data warehouse through performance of other data transformations or operations using the already corrupt data. Because issues are identified quickly, the effort required to correct the issues may also be greatly reduced. Further, the generated audit data may provide additional opportunities for analysis of batch data task performance and it may be applied to adjust parameters of the batch data task execution and auditing process in order to improve performance and reduce any time lag between recovery of a batch data task and validation of the batch data task. The user experience associated with batch data task performance is greatly improved due to the automation of the auditing, which may otherwise require manual performance, and due to the provided notifications, which lead to a substantial reduction in effort required to correct for incomplete or corrupt data associated with recovered batch data tasks. The invention operates in an unconventional manner to automatically identify and audit recovered batch data tasks to verify the accuracy of associated data warehouse records in a timely fashion. The efficiency of the associated batch data task system is improved and the time and effort required to maintain an associated data warehouse is reduced.

Figure 1:
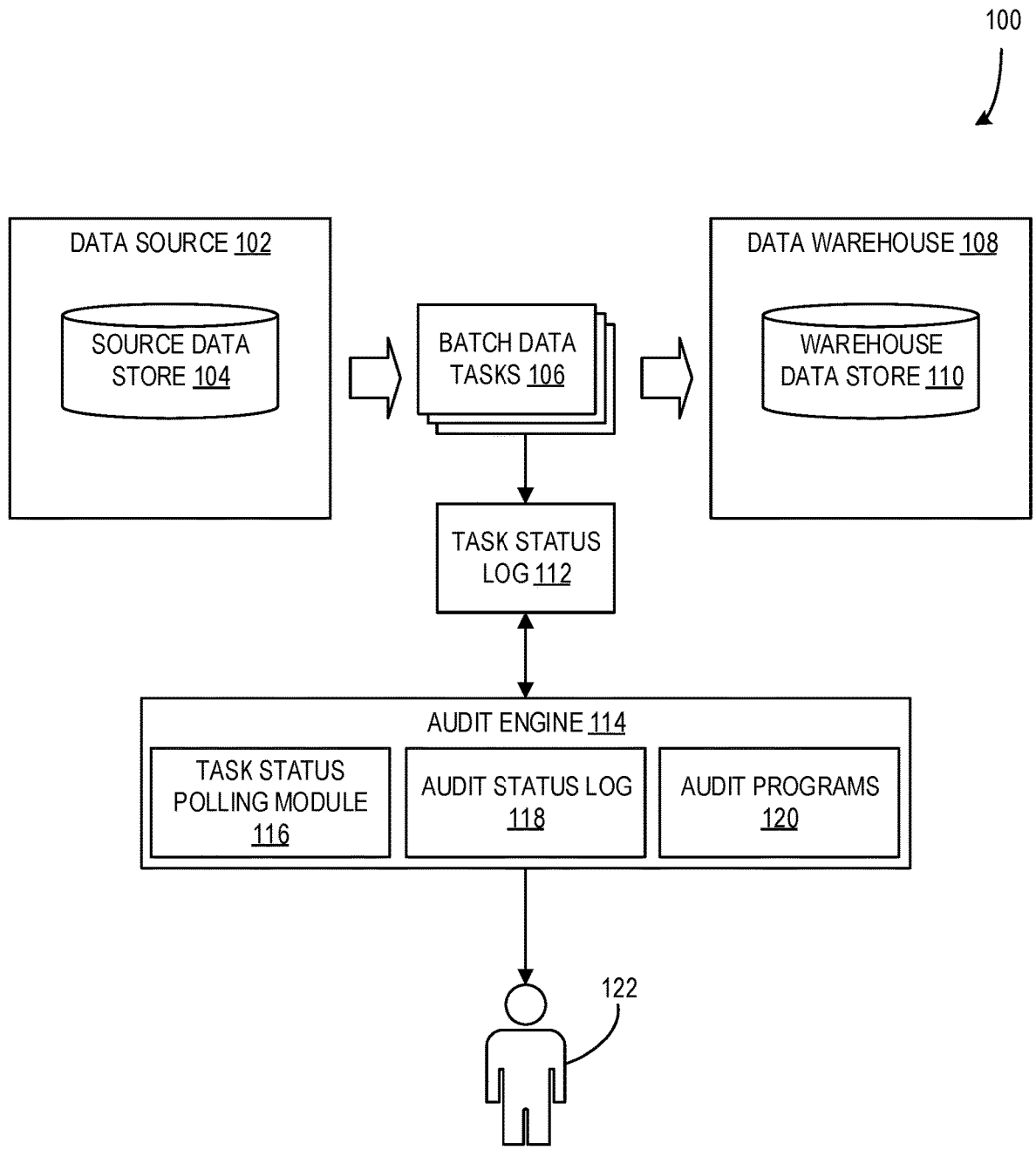
FIG. 1 is an exemplary block diagram illustrating a system configured for auditing batch data task recovery based on monitoring a task status log according to an embodiment.

FIG. 1 is an exemplary block diagram illustrating a system 100 configured for auditing batch data task recovery based on monitoring a task status log 112 according to an embodiment. The system 100 includes a data source 102 with a source data store 104, batch data tasks 106, and a data warehouse 108 with a warehouse data store 110. The data source 102 includes hardware, firmware, and/or software for receiving, storing, and providing access to data, such as processors, memory, and/or data storage devices (e.g., hard drives, solid state drives, etc.). The source data store 104 of the data source 102 may include one or more database tables, files, or the like, depending on the type or types of data storage for which the source data store 104 is configured (e.g., ORACLE-based storage, NETEZZA-based storage, HADOOP-based storage, etc.). In some examples, the data source 102 may be configured to store transaction data, customer data, merchant data, financial institution data, and/or other types of data used during operation of a payment network (e.g., MASTERCARD, etc.). However, the systems and methods described herein are not limited to such types of data and may be applied to other types of data without departing from the description herein.

Similarly, the data warehouse 108 includes hardware, firmware, and/or software for receiving, storing, and providing access to data, such as processors, memory, and/or data storage devices (e.g., hard drives, solid state drives, etc.). The warehouse data store 110 may include one or more database tables, files, or the like, depending on the type or types of data storage for which the warehouse data store 110 is configured (e.g., ORACLE-based storage, NETEZZA-based storage, HADOOP-based storage, etc.). While the data source 102 and data warehouse 108 are illustrated as separate entities in system 100, in some examples, the data source 102 and data warehouse 108 may be a single entity or otherwise associated with the same computing device(s), server(s), etc. and batch data tasks 106 may be performed to load, transform, and/or otherwise perform operations on data within the single entity that includes the data source 102 and the data warehouse 108. Alternatively, the data source 102 may be separate from the data warehouse 108 and the data source 102 and data warehouse 108 may be configured to store different types of data and/or use different types of data storage.

The batch data tasks 106 include software scripts and/or other programs that access data from the data source 102 as input, perform operations to extract, load, or transform the input or otherwise generate data based on the input, and provide output data to the data warehouse 108 based on the performed operations. For instance, a batch data task 106 may be configured to access one or more recently received raw data values from the data source 102 and amend other data in the data warehouse 108 that depends on the accessed raw data values (e.g., statistical or other analytics data may be adjusted in the data warehouse 108 based on the raw data in the data source 102, etc.). Such automated data tasks are useful for maintaining accuracy and consistency throughout large data sets, as well as for performing data transformation tasks necessary for data analysis and/or reporting. The system 100 may be configured to perform large quantities of batch data tasks 106 during a defined time period with minimal intervention or other interaction from users (e.g., batch data tasks may be configured to run daily, weekly, bi-weekly, etc.). In some examples, the system 100 includes a large quantity of batch data tasks (e.g., a "batch" of tasks, etc.) that are consistently executed repeatedly, such that, once execution of the batch data tasks is complete, the system 100 begins executing the batch data tasks again.

The system 100 is further configured to update a task status log 112 based on status and/or results of the batch data tasks 106. The task status log 112 may be one or more data table and/or data files stored in the system 100 (e.g., in the data source 102, the data warehouse 108, or another data store associated with the system 100, etc.). In some examples, the batch data tasks 106 are configured to update the task status log 112. Alternatively, or additionally, an associated task status monitor component of the system 100 may be configured to update the task status log 112 based on the batch data tasks 106. The task status log 112 may be updated with task status data when a batch data task 106 is executed, when the batch data task 106 is in progress, when the batch data task 106 is completed, when the batch data task 106 succeeds, when the batch data task 106 fails, etc. Task status data stored in the task status log 112 may include a batch data task identifier, a task status code or identifier, timestamp data, and/or other associated batch data task data.

The system 100 further includes an audit engine 114. The audit engine 114 includes hardware, firmware, and/or software configured for auditing the performance of batch data tasks as described herein. The audit engine 114 is configured to communicate with other components of the system 100 (e.g., the task status log 112, etc.) and/or users of the system 100 (e.g., user 122, etc.).

A task status polling module 116 of the audit engine 114 is configured to access the task status log 112 to identify batch data tasks 106 that have failed and/or batch data tasks 106 that have recovered from failure as described herein. The polling of the task status polling module 116 provides the audit engine 114 with the capability to perform operations automatically without additional user input after configuration. The task status polling module 116 periodically reads, or polls, the task status log 112 at a defined interval (e.g., a failure status poll interval, etc.) for batch data tasks 106 that have failed (e.g., detecting when a task failure status is posted to the task status log 112, etc.). When a failed batch data task 106 is identified, the task status polling module 116 is further configured to poll the task status log 112 at a defined interval (e.g., a recovery status poll interval, etc.) to determine when the batch data task 106 failure has been recovered (e.g., detecting when a task recovery status associated with the failed batch data task 106 is posted to the task status log 112, etc.).

In some examples, the task status polling module 116 includes polling parameter data that determines when and/or how frequently the module polls the task status log 112. The polling parameter data may include a failure status poll interval value that indicates the rate at which the task status polling module 116 polls for failed batch data tasks (e.g., once an hour, once every 2 hours, once every 30 minutes, etc.). Further, the task status polling module 116 may include a separate recovery status poll interval value that indicates the rate at which the task status polling module 116 polls for recovery status indicators of batch data tasks that have failed (e.g., once every 15 minutes, once every 10 minutes, once every 5 minutes, etc.). In some examples, a recovery status poll interval value may be specific to a batch data task or a set of batch data tasks. The recovery status poll interval value may be set based on a length of time required to execute the associated batch data task, the length of time that is likely to be required to recover from failure of the batch data task, the type of recovery required (e.g., automatic recovery process, manual recovery process, etc.), or based on other aspects of the recovery of the associated batch data task. In some examples, recovery status poll interval values may be adjusted based on feedback (e.g., interval between failure and recovery for the batch data task in previous failures, rate of failures of the batch data task, audit results based on the recovery, etc.) as described herein.

The audit engine 114 further includes an audit status log 118 and audit programs 120. The audit engine 114 maintains the audit status log 118 based on the performance of the audit programs 120. Upon detection of a failure of a batch data task 106, the audit engine 114 is configured to add a "queued" status indicator associated with the failed batch data task 106 on the audit status log 118. The task status polling module 116 may be configured to access the audit status log 118 to determine which batch data tasks 106 to poll for recovery statuses on the task status log 112. The task status polling module 116 identifies batch data tasks 106 that have a "queued" status on the audit status log 118 and initiates recovery status polling associated with the identified batch data tasks 106 on the task status log 112.

After the recovery of a failed batch data task 106 is detected on the task status log 112, the audit engine 114 is configured to execute one or more audit programs 120 associated with the failed batch data task 106. In some examples, the audit engine 114 updates the audit status log 118 with a "ready" status indicator for batch data tasks 106 that have been recovered. Another process of the audit engine 114 may be configured to poll the audit status log 118 for batch data tasks 106 with a "ready" status indicator. When a "ready" status indicator is detected, the audit engine 114 executes the one or more audit programs 120 associated with the batch data task 106. The audit status log 118 may further be updated during this process with "in progress" status indicators indicating that the audit of the associated batch data task 106 is in progress, "passed" status indicators indicating that the audit of the associated batch data task 106 was completed and successful, "failed" status indicators indicating that the audit of the associated batch data task 106 was completed and unsuccessful, and "terminated" status indicators indicating that execution of the associated audit program 120 was incomplete or has otherwise failed. In other examples, other types of status indicators may be used in the audit status log 118 without departing from the description herein. An exemplary data field set of an audit status log 118 is shown below in Table 1.

TABLE 1

| Data Field Name | Data Type |
| --- | --- |
| TABLE_NAM | VARCHAR2 (60 Byte) |
| DB_TYPE_NAM | VARCHAR2 (16 Byte) |
| DB_NAM | VARCHAR2 (16 Byte) |
| BAT_NAM | VARCHAR2 (32 Byte) |
| TASK_NAM | VARCHAR2 (100 Byte) |
| BAT_ID | NUMBER |
| TASK_ID | NUMBER |
| DW_PROCSS_DT | DATE |
| TASK_CURR_STAT_CD | VARCHAR2 (16 Byte) |
| FAILED_TS | TIMESTAMP(6) |
| SUCCESS_TS | TIMESTAMP(6) |
| AUDIT_CURR_STAT_CD | VARCHAR2 (16 Byte) |

The data fields of Table 1 are exemplary fields that may be associated with each entry of the audit status log 118 in an example. The TABLE_NAM field includes the name of the data table with which the associated audit program or programs are associated (e.g., the data table on which the audit program(s) is performed, etc.). The DB_TYPE_NAM includes the name of the type of database with which the data table is associated (e.g., ORACLE, NETEZZA, HADOOP, etc.). The DB_NAM includes the specific database name with which the data table is associated. The BAT_NAM includes the name of the batch with which the audit is associated. The TASK_NAM includes the name of the specific batch data task with which the audit is associated. Similarly, the BAT_ID and TASK_ID include identifiers of the batch and batch data task with which the audit is associated, respectively. The DW_PROCSS_DT includes the data warehouse processing date, or the date that the batch associated with the audit was executed. The TASK_CURR_STAT_CD includes a status code indicating the current status of the batch data task, which may be obtained from the task status log 112. The FAILED_TS and SUCCESS_TS include timestamps for the failure of the batch data task and/or the success of the batch data task respectively. The AUDIT_CURR_STAT_CD includes a status code indicative of the current status of the audit, which may include the audit status indicators described above. The fields of Table 1 are exemplary and, in other examples, the entries of the audit status log 118 may include more, fewer, and/or different fields without departing from the description herein.

The data of the audit status log 118 may be used to monitor the status of audit processes of associated batch data tasks, as well as for statistical analysis of batch data task failure, recovery, and/or audits, and/or other audit data pattern detection and analysis.

The audit programs 120 include software configured to audit the performance of associated batch data tasks 106 based on data in the data source 102 and/or the data warehouse 108 affected by the batch data tasks 106. The audit programs 120 may include scripts or other program files configured to be compatible with the source data store 104 and/or the warehouse data store 110 (e.g., SYNCSORT scripts to audit data files stored on a UNIX server, ORACLE queries to audit ORACLE tables, NETEZZA queries to audit NETEZZA tables, HADOOP queries to audit HADOOP-based Hive tables, UNIX shell scripts to perform more complex validations, including multi-language and/or multi-data source validations, etc.). In some examples, an audit program 120 associated with a batch data task 106 is configured to determine a quantity of data records that the batch data task 106 should affect (e.g., create, transform, update, etc.) and to access the warehouse data store 110 to confirm that the determined quantity of data records was affected by the batch data task 106. Alternatively, or additionally, the audit programs 120 may be configured to audit other aspects of the performance of batch data tasks 106. For instance, an audit program 120 may be configured to access the input data of an associated batch data task 106 from the source data store 104, determine, based on the accessed input data, specific data values in the warehouse data store 110 that should be affected by the batch data task 106, and access the warehouse data store 110 to confirm that the specific data values have been affected as determined. In other examples, two or more audit programs 120 may be associated with a particular batch data task 106, one of which may be configured to gather statistics and/or other data from a data source associated with the batch data task 106 and another of which may be configured to gather statistics and/or other data from target data of the batch data task 106.

Each batch data task 106 may be associated with one or more audit programs 120. Each audit program 120 may be associated with a single batch data task 106. When a batch data task 106 is created by a developer or other user of the system 100, associated audit programs 120 may also be created and stored on the audit engine 114 or in memory or data storage associated with the audit engine 114. By enabling developers to provide audit programs 120 that are configured for automatic performance, the audit engine 114 provides developers with the capability to cause recovered batch data tasks 106 to be audited and verified without further user input or interaction as described herein.

In some examples, the audit engine 114 is further configured to include a machine learning component configured to adjust the audit engine 114 based on audit results as feedback data. For instance, the audit engine 114 may analyze patterns of batch data task failures, recoveries, and the timings thereof to tune the failure status poll interval(s) and recovery status poll interval(s) for improved efficiency in auditing batch data task performance (e.g., adjusting the interval timing to prevent execution of polling that is unlikely to identify polled statuses, adjusting the interval timing to reduce time between the associated status being updated and being identified during a poll operation, etc.). Further, the audit engine 114 may be configured to recommend adjustments for batches of batch data tasks 106 and/or specific batch data tasks 106 using the audit results as feedback data. For instance, the audit engine 114 may identify subsets of batch data tasks 106 fail with higher frequency, batch data tasks 106 that require extended time periods for recovery, and/or batch data tasks 106 that fail to recover properly with higher frequency. Any and/or all of these aspects may cause a batch data task 106 to be flagged by the audit engine 114 as being high risk and/or high expense. The audit engine 114 may further notify users of the flagged batch data tasks 106 and encourage responsible parties to consider changes and/or improvements for the flagged batch data tasks 106 (e.g., the audit engine 114 may send automated electronic mail (e-mail) or other messages to responsible parties of batch data tasks 106 that exceed a defined threshold of cost or risk (e.g., the top 10% costliest batch data tasks, etc.), etc.).

In some examples, the machine learning module of the audit engine 114 comprises a trained regressor such as a random decision forest, directed acyclic graph, support vector machine, neural network, or other trained regressor. The trained regressor may be trained using the feedback data described above. Examples of trained regressors include a convolutional neural network and a random decision forest. It should further be understood that the machine learning module, in some examples, may operate according machine learning principles and/or techniques known in the art without departing from the systems and/or methods described herein.

In an example, the machine learning module of the audit engine 114 may make use of training data pairs when applying machine learning techniques and/or algorithms. Millions of training data pairs (or more) may be stored in a machine learning data structure. In some examples, a training data pair includes a timestamp-based feedback data value paired with an interval adjustment value. The pairing of the two values demonstrates a relationship between the feedback data value and the adjustment values that may be used by the machine learning module to determine future interval adjustments according to machine learning techniques and/or algorithms.

Figure 2:
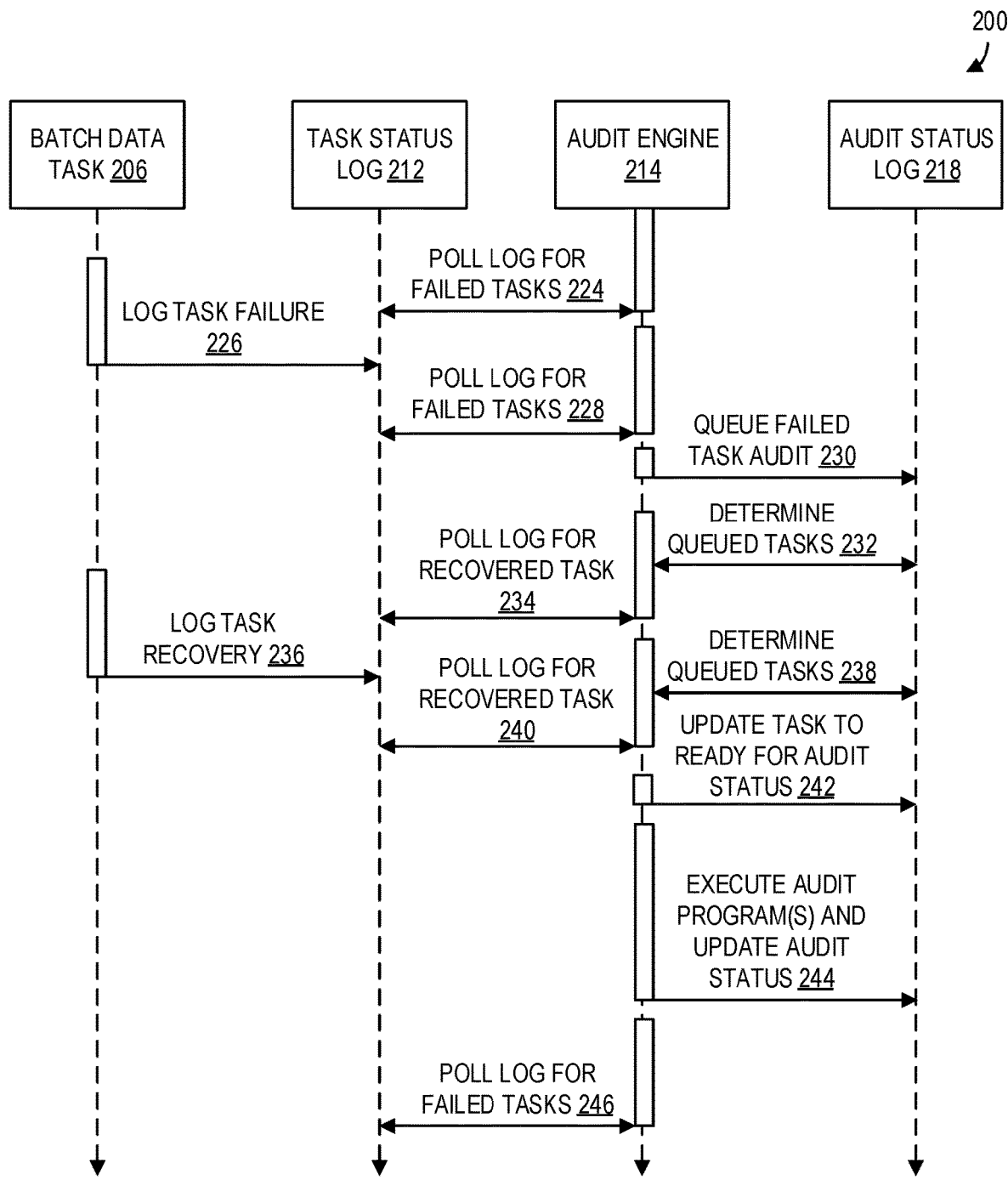
FIG. 2 is an exemplary sequence diagram illustrating operations and interactions of components of the batch data task auditing system of FIG. 1 according to an embodiment.

FIG. 2 is an exemplary sequence diagram 200 illustrating operations and interactions of components of the batch data task auditing system 100 of FIG. 1 according to an embodiment. The described sequence of operations and/or interactions includes operations and/or interactions between a batch data task 206, a task status log 212, an audit engine 214 and an audit status log 218. At 224, the audit engine 214 polls the task status log 212 for failed tasks. The polling enables the audit engine 214 to identify any batch data tasks that are associated with "failed" entries in the task status log 212 that have not been detected in previous polling operations. At 224, the task status log 212 does not include any new "failed" entries. The audit engine 214 takes no further action until the next scheduled polling.

After the first polling by the audit engine 214, at 226, a batch data task 206 logs a task failure in the task status log 212. In some examples, a batch data task manager component may be configured to record status log data on behalf of the batch data task 206 and other batch data tasks during operation. Alternatively, batch data task 206 may be configured to directly record status log data to the task status log 212 during operation. The recorded task status data of the batch data task 206 to the task status log 212 includes at least an identifier of the batch data task 206 and a "failed" status indicator. The task status data may further include other task status data, such as timestamp data associated with a date-time of the execution of the associated batch data task.

At 228, the next scheduled polling of the task status log 212 by the audit engine 214 is performed. The "failed" status of batch data task 206 recorded at 226 is identified by the audit engine 214 during this polling. The audit engine 214 schedules the next polling for failed tasks (e.g. polling at 246 as described below, etc.) and proceeds to handle the identified batch data task 206. At 230, the audit engine 214 queues an audit of the failed task 206 and records the "queued" status of the audit on the audit status log 218. At 232, the audit engine 214 performs a scheduled check (e.g., scheduled based on a recovery status poll interval, etc.) for queued task audits and identifies the "queued" audit of the failed task 206 from the audit status log 218.

After identifying the queued audit, at 234, the audit engine 214 polls the task status log 212 for a "recovered" task status log entry associated with the batch data task 206. The batch data task 206 has not recovered yet, so the audit engine 214 cannot identify an associated "recovered" task status log entry.

Later, at 236, the batch data task 206 or an associated batch task manager component logs a recovery of the batch data task 206 to the task status log 212. At 238, the audit engine 214 performs another scheduled check for queued task audits and identifies the "queued" audit of the batch data task 206 from the audit status log 218 again. At 240, the audit engine 214 polls the task status log 212 again for a "recovered" task status log entry associated with the batch data task 206. The logged recovery of the batch data task 206 from 236 is identified by the audit engine 214.

Based on determining that the batch data task 206 has recovered, the audit engine 214 updates the queued task audit of the batch data task 206 to a "ready for audit" status on the audit status log 218 at 242. Then, at 244, the audit engine 214 executes audit programs and/or scripts associated with the batch data task 206. Based on the results of the executed audit programs and/or scripts, the audit engine 214 also updates the status of the audit on the audit status log

218. For instance, the status may be updated to "in progress", "passed", "failed", or "terminated" as described above. The results of the audit on the audit status log 218 may then by used by the audit engine 214 and/or other programs of the system to respond to the audit or task failure and/or to analyze audit results of the batch data task 206 and/or other associated audit results as described herein.

After the audit engine 214 completes the execution of the audit programs, the audit engine 214 polls the task status log 212 for failed tasks again at 246. While, the polling event 246 is illustrated as occurring after the other operations of the diagram 200, in some examples, the failed task polling events and recovered task polling events of the audit engine 214 are scheduled at defined intervals and they may occur substantially in parallel with other operations of the audit engine 214 (e.g., accessing, polling, and/or updating the audit status log 218, executing audit programs, etc.).

Figure 3:
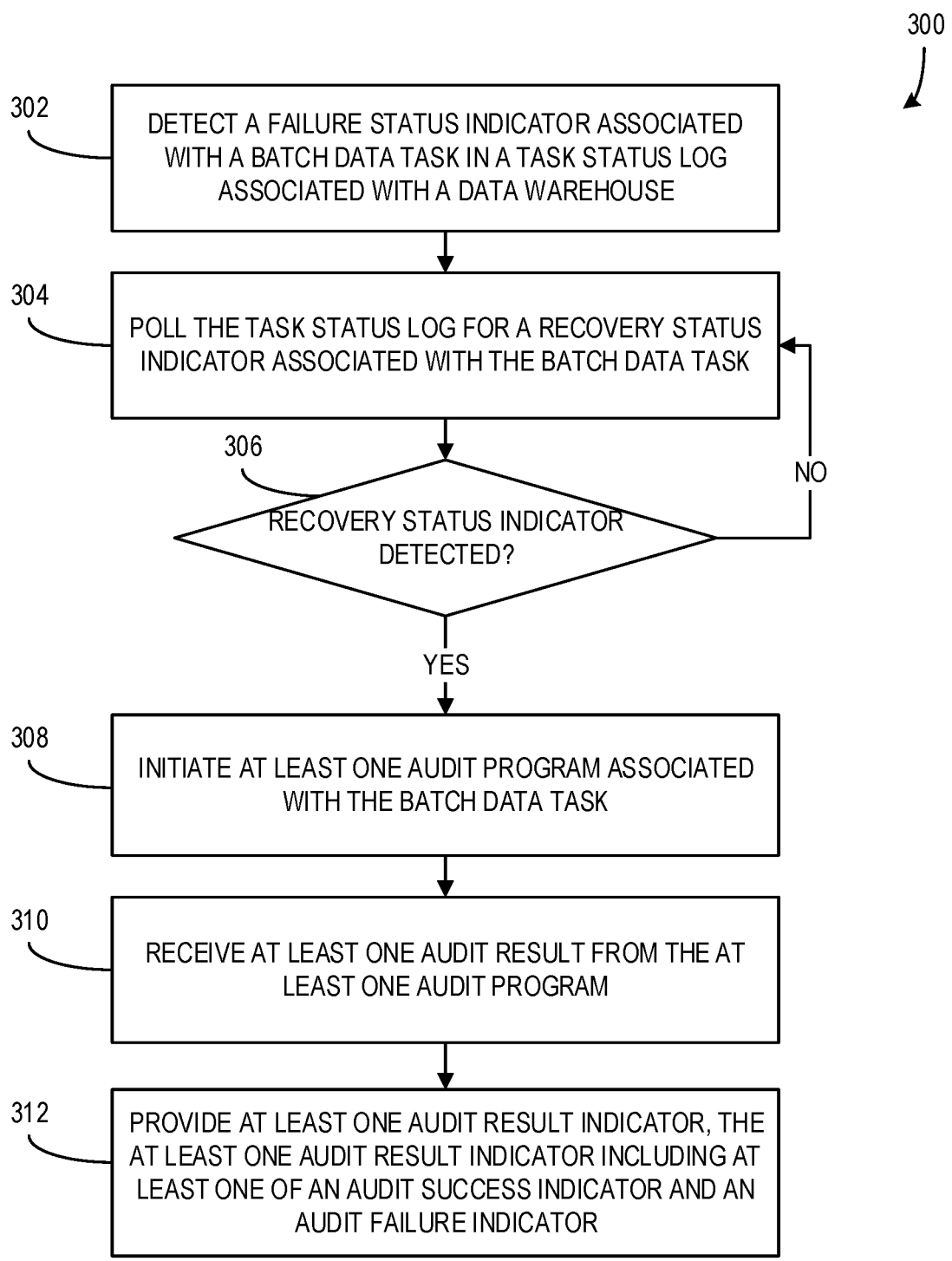
FIG. 3 is an exemplary flow chart illustrating auditing the recovery of failed batch data tasks according to an embodiment.

FIG. 3 is an exemplary flow chart 300 illustrating auditing the recovery of failed batch data tasks according to an embodiment. In some examples, the system 100 of FIG. 1 or other similar systems may be configured to perform the operations described in flow chart 300. At 302, a failure status indicator is detected. The failure status indicator is associated with a batch data task in a task status log associated with a data warehouse.

At 304, the task status log is polled for a recovery status indicator associated with the batch data task. If a recovery status indicator is detected at 306, the process proceeds to 308. Alternatively, if a recovery status indicator is not detected at 306, the process returns to repeat the polling operation at 304.

At 308, at least one audit program associated with the batch data task is initiated. The at least one audit program may be configured to audit the performance of the batch data task based on validation of the input data from a data source and output data at a data target of the batch data task as described herein. The validation may include validating a record count of total records affected and/or specific data value validation of one or more affected data records.

At 310, at least one audit result is received from the at least one audit program. The at least one audit result may include results indicating that the recovered batch data task has passed one or more of the performed audit programs, failed one or more of the performed audit programs, or that one or more of the performed audit programs have terminated without completing, as described herein.

At 312, at least one audit result indicator is provided based on the at least one audit result. The at least one audit result indicator includes at least on of an audit success indicator or an audit failure indicator. Each provided audit result indicator may be used as a data point for further data analysis of batch data task performance, adjustment of batch data task status polling, notification of responsible parties, etc. The audit result indicators may be provided for storage in a defined data store, provided to a machine learning component for use in making adjustments to the system based on machine learning techniques, and/or communicated to one or more users of the system.

In some examples, the provided audit result indicator may be stored and combined with a plurality of other audit result indicators for use in providing a combined batch data task audit report to one or more users. The audit report may include the audit result indicators and associated batch data task identifiers as well as metrics based on the audit results and/or associated task failure data (e.g., a task failure rate associated with a group of batch data tasks and/or a single batch data task, a successful task recovery rate associated with a group of batch data tasks and/or a single batch data task, etc.).

Figure 4:
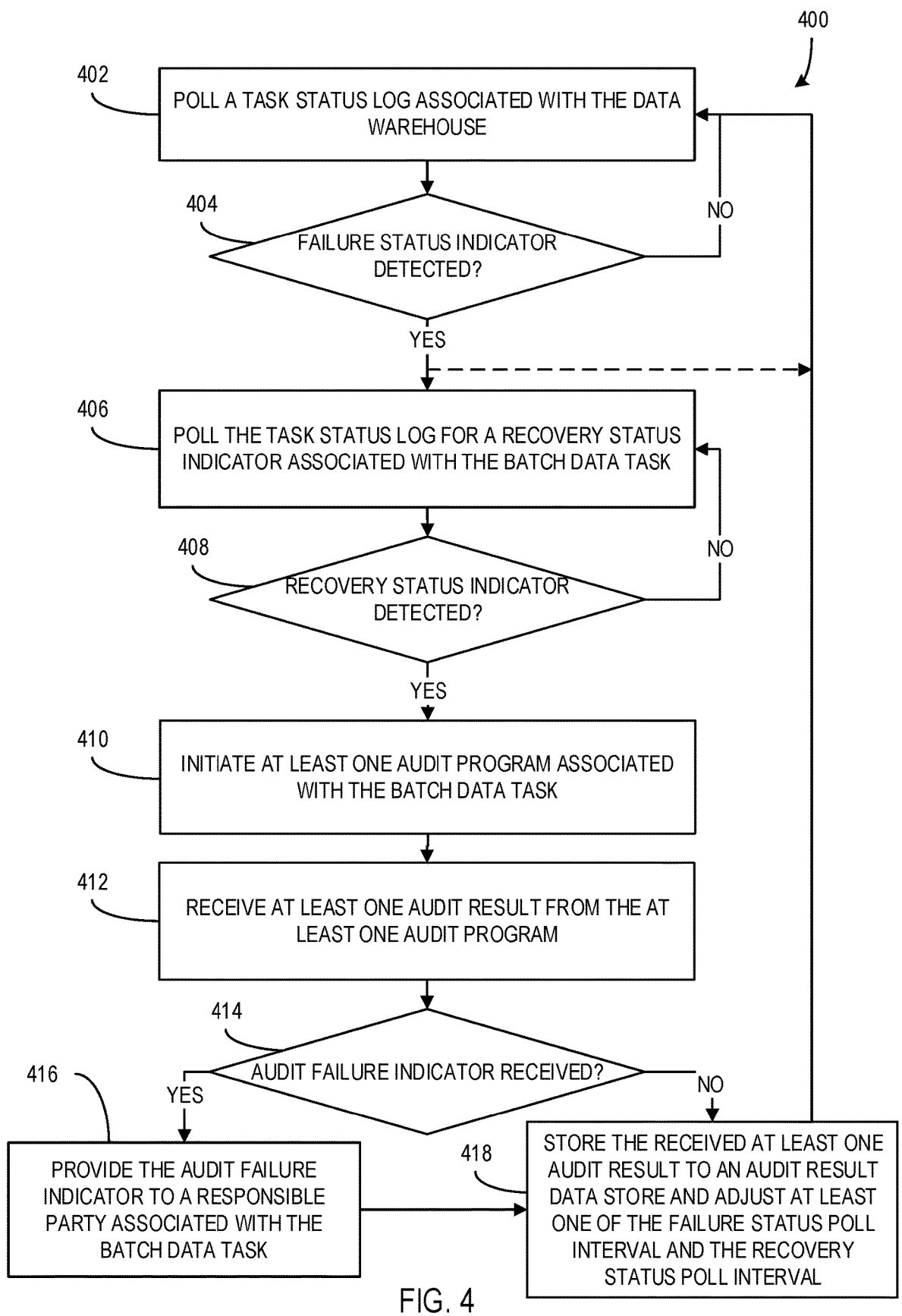
FIG. 4 is an exemplary flow chart illustrating auditing the recovery of failed batch data tasks, including notifying a responsible party in the event of an audit failure indicator being received according to an embodiment.

FIG. 4 is an exemplary flow chart 400 illustrating auditing the recovery of failed batch data tasks, including notifying a responsible party in the event of an audit failure indicator being received according to an embodiment. In some examples, the system 100 of the FIG. 1 and other similar systems may be configured to perform the operations described in flow chart 400. At 402, a task status log associated with the data warehouse is polled. If, at 404, a failure status indicator is detected, the process proceeds to 406. Alternatively, if a failure status indicator is not detected at 404, the process returns to 402 to repeat the polling operation. In some examples, after detecting a failure status indicator at 404, an associated sub-process or thread may return to 402 to repeat the polling operation of the task status log at defined intervals while the remainder of the flow chart 400 is being performed.

At 406, the task status log is polled for a recovery status indicator associated with the batch data task for which a failure status indicator was previously detected. If, at 408, a recovery status indicator of the batch data task is detected, the process proceeds to 410. Alternatively, if a recovery status indicator is not detected at 408, the process returns to 406 to repeat the recovery status indicator polling operation. The repeated polling operation may be configured to occur at a defined interval as described herein.

At 410, at least one audit program associated with the batch data task is initiated and, at 412, at least one audit result from the at least one audit program is received. Operations 410 and 412 may be performed in a substantially identical manner as described above with respect to operations 308 and 310 of FIG. 3.

If, at 414, an audit failure indicator is not received based on the received at least one audit result, the process proceeds to 418. Alternatively, if, at 414, an audit failure indicator is received, the audit failure indicator is provided to a responsible party associated with the batch data task at 416. The audit failure indicator may be provided to a responsible party based on stored contact data of the responsible party (e.g., an e-mail address, username of an instant messenger or other messaging program, phone number, etc.). After providing the audit failure indicator to a responsible party, the process proceeds to 418.

At 418, the received audit result is stored to an audit result data store. Further, at least one of the failure status poll interval and the recovery status poll interval is adjusted based on the stored audit result. In some examples, the poll intervals may be adjusted to better align with task recovery patterns and/or audit program execution patterns using one or more stored audit results as feedback, as described herein. For instance, when a recovery status poll interval is defined to be 15 minutes (e.g., the task status log is polled every 15 minutes to identify recovery status indicators associated with batch data tasks that had previously failed, etc.) and collected task recovery and audit data indicates that some failed tasks require only 10 minutes to recover, the recovery status poll interval may be adjusted to be 10 minutes to enhance the speed with which the audit engine responds to recovered tasks. Alternatively, a recovery status poll interval may be adjusted to be longer if the audit engine is found to be executing polls too frequently and/or the polls are frequently not identifying recovery status indicators during each polling. The process may then return to 402 to continue polling the task status log based on the failure status poll interval that may have been recently adjusted.

Additional Example Scenarios

Aspects of the disclosure enable various additional scenarios, such as next described.

In an example, a data storage system includes a large quantity of batch data tasks that are executed on regular intervals. The batch data tasks are configured to load, extract, and/or transform data in the data warehouse of the data storage system as described herein. The data storage system further includes an audit engine (e.g., audit engine 114, etc.) associated with the batch data tasks. The audit engine polls the task status log associated with the batch data tasks once per hour for failure status indicators. At a first polling, the audit engine reads the task status log and does not find any failure status indicators. The audit engine then schedules the next polling to occur in approximately one hour (e.g., the scheduling may account for time spent by the audit engine to poll the task status log, etc.).

On the next polling, the audit engine reads the task status log starting with the first record written to the log after the previous polling and reading up to the most recently written record. The audit engine identifies a first failed batch data task and a second failed batch data task. The audit engine updates the audit status log with queued status indicators for both the first and second failed batch data tasks. Once the audit status log includes the queued status indicators, the audit engine schedules a polling event of the task status log for recovery status indicators every 15 minutes.

After 15 minutes, the audit engine executes a scheduled polling event for recovery status indicators associated with the first failed batch data task and the second failed batch data task. The audit engine identifies a recovery status indicator for the first failed batch data task but not for the second failed batch data task. The audit engine schedules another recovery status polling event for the second failed batch data task in 15 minutes. Then, the audit engine updates the status of the first failed batch data task on the audit status log to "ready for audit", and the audit engine causes two audit programs associated with the first failed batch data task to be executed. The audit status of the first failed batch data task may then be updated to "in progress".

The two audit programs of the first failed batch data task are scripts configured to be executed sequentially. The first audit program queries for data that was used as input data for the first failed batch data task. Upon identifying the input data, the second audit program uses the identified input data to determine what data should have been written by the first failed batch data task upon completion. The second audit program then compares the determined data to the data that is actually present in the data warehouse and finds that the two data sets match. As a result, the recovery of the first failed batch data task is validated. The audit status of the first failed batch data task is updated as "successful". The audit engine then records the successful audit status indicator for later use in data analysis and communicates the audit result to a responsible party of the first failed batch data task, such that the responsible party is informed that the recovery was successful.

Later, the audit engine performs another recovery status poll of the task status log for recovery status indicators of the second failed batch data task. The audit engine identifies a recovery status indicator and updates the audit status of the second failed batch data task to "ready for audit". The audit engine then executes audit programs associated with the second failed batch data task as described herein. The results of the executed audit programs include a failure for one of the audit programs. The audit results are recorded and a responsible party for the second failed batch data task is notified that the recovery of the batch data task was unsuccessful. The notification further includes information associated with why the validation failed, enabling the responsible party to take action to correct the issue.

The audit engine then continues to poll for failure status indicators in the task status log at scheduled intervals as described herein.

Exemplary Operating Environment

Figure 5:
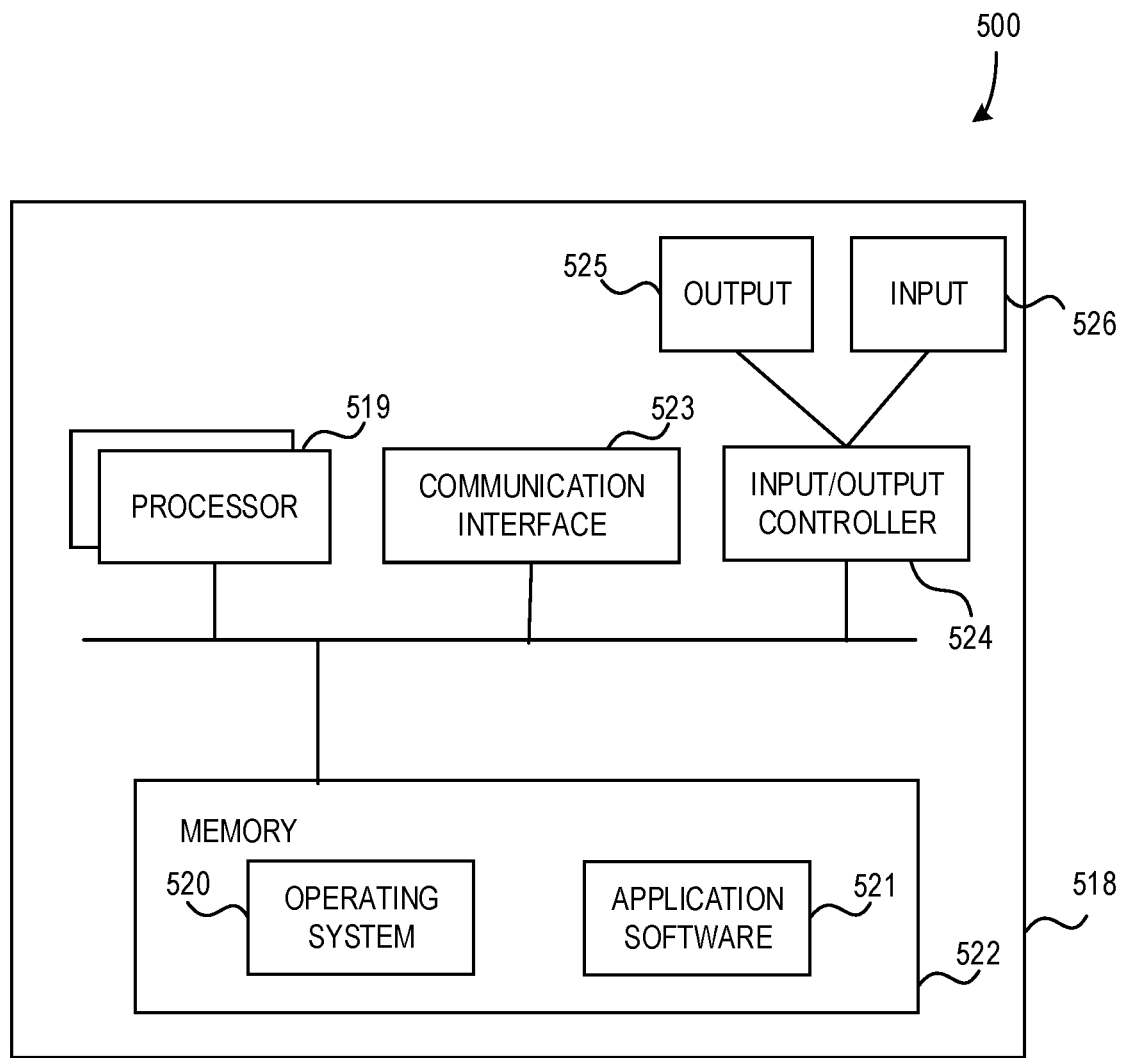
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Platform software comprising an operating system 520 or any other suitable platform software may be provided on the apparatus 518 to enable application software 521 to be executed on the device. According to an embodiment, monitoring and auditing the failure and recovery of batch data tasks as described herein may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for auditing batch data tasks in a data warehouse comprising:

at least one processor; and at least one memory comprising computer program code, the at least one memory and the computer program code configured to, with the at least one processor, cause the at least one processor to:

detect a failure status indicator associated with a batch data task in a task status log associated with the data warehouse;

based on detecting the failure status indicator of the batch data task, poll the task status log for a recovery status indicator associated with the batch data task;

based on detecting the recovery status indicator associated with the batch data task during the polling of the task status log, initiate at least one audit program associated with the batch data task;

receive at least one audit result from the at least one audit program; and based on the received at least one audit result, provide at least one audit result indicator, the at least one audit result indicator including at least one of an audit success indicator indicating that a recovery of the batch data task has succeeded and an audit failure indicator indicating that the recovery of the batch data task has failed.

wherein detecting the failure status indicator includes polling the task status log for a failure status indicator periodically based on a defined failure status poll interval; and wherein polling the task status log for a recovery status indicator includes polling the task status log for a recovery status indicator periodically based on a defined recovery status poll interval.

wherein the at least one memory and the computer program code configured to, with the at least one processor, further cause the at least one processor to:

store failure status indicators and associated audit results of a plurality of batch data tasks; and adjust at least one of the failure status poll interval and the recovery status poll interval based on an application of at least one machine learning rule to the stored failure status indicators and associated audit results.

wherein providing the at least one audit result indicator includes determining a contact method of a responsible party associated with the batch data task and providing the at least one audit result indicator to the responsible party using the determined contact method.

wherein providing the at least one audit result indicator includes storing the at least one audit result indicator and an associate batch data task identifier task audit data store, the task audit data store including a plurality of audit result indicators associated with a plurality of batch data tasks, and periodically providing a task audit report based on the task audit data store to a responsible party.

wherein the at least one memory and the computer program code configured to, with the at least one processor, further cause the at least one processor to:

analyze data of the task audit data store;
generate task audit metrics based on the analysis of the data of the task audit data store, the task audit metrics including at least one of a task failure rate and a task recovery failure rate associated with a subset of batch data tasks of the data warehouse;
wherein the generated task audit metrics are included in the provided task audit report.
wherein the at least one audit program includes at least one of a program that verifies a quantity of data records transformed by the batch data task during recover, a program that verifies a type of data records transformed by the batch data task, and a program that verifies that at least one specific data record was transformed by the batch data task.
wherein the at least one memory and the computer program code configured to, with the at least one processor, further cause the at least one processor to:
receive a new audit program and a batch data task identifier associated with the batch data task; and
record the new audit program such that the new audit program is associated with the batch data task;
wherein initiating at least one audit program associated with the batch data task includes initiating the new audit program.
A computerized method for auditing batch data tasks in a data warehouse, the method comprising:
detecting, by a processor, a failure status indicator associated with a batch data task in a task status log associated with the data warehouse;
based on detecting the failure status indicator of the batch data task, polling, by the processor, the task status log for a recovery status indicator associated with the batch data task;
based on detecting the recovery status indicator associated with the batch data task during the polling of the task status log, initiating, by the processor, at least one audit program associated with the batch data task;
receiving, by the processor, at least one audit result from the at least one audit program; and
based on the received at least one audit result, providing, by the processor, at least one audit result indicator, the at least one audit result indicator including at least one of an audit success indicator indicating that a recovery of the batch data task has succeeded and an audit failure indicator indicating that the recovery of the batch data task has failed.
wherein detecting the failure status indicator includes polling the task status log for a failure status indicator periodically based on a defined failure status poll interval; and
wherein polling the task status log for a recovery status indicator includes polling the task status log for a recovery status indicator periodically based on a defined recovery status poll interval.
further comprising:
storing failure status indicators and associated audit results of a plurality of batch data tasks; and
adjusting at least one of the failure status poll interval and the recovery status poll interval based on an application of at least one machine learning rule to the stored failure status indicators and associated audit results.
wherein providing the at least one audit result indicator includes determining a contact method of a responsible party associated with the batch data task and providing the at least one audit result indicator to the responsible party using the determined contact method.
wherein providing the at least one audit result indicator includes storing the at least one audit result indicator and an associate batch data task identifier task audit data store, the task audit data store including a plurality of audit result indicators associated with a plurality of batch data tasks, and periodically providing a task audit report based on the task audit data store to a responsible party.
further comprising:
analyzing data of the task audit data store;
generating task audit metrics based on the analysis of the data of the task audit data store, the task audit metrics including at least one of a task failure rate and a task recovery failure rate associated with a subset of batch data tasks of the data warehouse;
wherein the generated task audit metrics are included in the provided task audit report.
wherein the at least one audit program includes at least one of a program that verifies a quantity of data records transformed by the batch data task during recover, a program that verifies a type of data records transformed by the batch data task, and a program that verifies that at least one specific data record was transformed by the batch data task.
further comprising:
receiving a new audit program and a batch data task identifier associated with the batch data task; and
recording the new audit program such that the new audit program is associated with the batch data task;
wherein initiating at least one audit program associated with the batch data task includes initiating the new audit program.
One or more computer storage media having computer-executable instructions for auditing batch data tasks in a data warehouse that, upon execution by a processor, cause the processor to at least:
detect a failure status indicator associated with a batch data task in a task status log associated with the data warehouse;
based on detecting the failure status indicator of the batch data task, poll the task status log for a recovery status indicator associated with the batch data task;
based on detecting the recovery status indicator associated with the batch data task during the polling of the task status log, initiate at least one audit program associated with the batch data task;
receive at least one audit result from the at least one audit program; and
based on the received at least one audit result, provide at least one audit result indicator, the at least one audit result indicator including at least one of an audit success indicator indicating that a recovery of the batch data task has succeeded and an audit failure indicator indicating that the recovery of the batch data task has failed.
wherein detecting the failure status indicator includes polling the task status log for a failure status indicator periodically based on a defined failure status poll interval; and
wherein polling the task status log for a recovery status indicator includes polling the task status log for a recovery status indicator periodically based on a defined recovery status poll interval.
wherein the computer-executable instructions, upon execution by a processor, further cause the processor to at least:

store failure status indicators and associated audit results of a plurality of batch data tasks; and adjust at least one of the failure status poll interval and the recovery status poll interval based on an application of at least one machine learning rule to the stored failure status indicators and associated audit results.

wherein providing the at least one audit result indicator includes determining a contact method of a responsible party associated with the batch data task and providing the at least one audit result indicator to the responsible party using the determined contact method.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for detecting a failure status indicator associated with a batch data task in a task status log associated with a data warehouse, means for polling the task status log for a recovery status indicator associated with the batch data task based on detecting the failure status indicator of the batch data task, means for initiating at least one audit program associated with the batch data task based on detecting the recovery status indicator associated with the batch data task, means for receiving at least one audit result from the at least one audit program, and means for providing at least one audit result indicator based on the received at least one audit result, the at least one audit result indicator including at least one of an audit success indicator indicating that a recovery of the batch data task has succeeded and an audit failure indicator indicating that the recovery of the batch data task has failed. The illustrated one or more processors 519 together with the computer program code stored in memory 522 constitute exemplary processing means for polling logs at defined intervals, executing audit programs associated with failed batch data tasks, and performing operations such as adjusting polling intervals based on audit results as described herein.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for auditing batch data tasks in a data warehouse comprising:
   at least one processor; and
   at least one memory comprising computer program code, the at least one memory and the computer program code configured to, with the at least one processor, cause the at least one processor to:
   detect a failure status indicator associated with a batch data task in a task status log associated with the data warehouse;
   based on detecting the failure status indicator of the batch data task, poll the task status log for a recovery status indicator associated with the batch data task;
   based on detecting the recovery status indicator associated with the batch data task during the polling of the task status log, initiate at least one audit program associated with the batch data task;
   receive at least one audit result from the at least one audit program;
   based on the received at least one audit result, provide at least one audit result indicator, the at least one audit result indicator including an indication that a recovery of the batch data task has succeeded; and
   upon the at least one audit result indicator including the indication that the recovery has succeeded, automatically perform a validation of the recovery of the batch data task, performing the validation including identifying input data for the batch data task, determining expected data, the expected data being data that would be produced upon the batch data task being correctly performed on the input data, comparing the expected data with output data, and validating the recovery upon the output data matching the expected data.

2. The system of claim 1, wherein performing the validation includes one or more of: determining a data corruption after the recovery and verifying an accuracy of records associated with the batch data task in the data warehouse after the recovery.

3. The system of claim 1, wherein detecting the failure status indicator includes polling the task status log for a failure status indicator periodically based on a defined failure status poll interval, and polling the task status log for a recovery status indicator includes polling the task status log for the recovery status indicator periodically based on a defined recovery status poll interval and the at least one memory and the computer program code configured to, with the at least one processor, further cause the at least one processor to:
store failure status indicators and associated audit results of a plurality of batch data tasks; and
adjust at least one of the failure status poll interval and the recovery status poll interval based on an application of at least one machine learning rule to the stored failure status indicators and associated audit results.

4. The system of claim 2, wherein verifying the accuracy of records associated with the batch data task in the data warehouse after the recovery includes determining, based on accessing input data, specific data values in the data warehouse that should be affected by the batch data task, and confirming that the specific data values in the data warehouse have been affected.

5. The system of claim 1, wherein providing the at least one audit result indicator includes storing the at least one audit result indicator and an associate batch data task identifier task audit data store, the task audit data store including a plurality of audit result indicators associated with a plurality of batch data tasks, and periodically providing a task audit report based on the task audit data store to a responsible party.

6. The system of claim 5, the at least one memory and the computer program code configured to, with the at least one processor, further cause the at least one processor to:
analyze data of the task audit data store;
generate task audit metrics based on the analysis of the data of the task audit data store, the task audit metrics including at least one of a task failure rate and a task recovery failure rate associated with a subset of batch data tasks of the data warehouse; and
wherein the generated task audit metrics are included in the provided task audit report.

7. The system of claim 1, wherein detecting the failure status indicator comprises recording a queued status of a failed batch data task in an audit status log and polling the task status log includes identifying the queued status in the audit status log and polling the task status log at a defined recovery status poll interval.

8. The system of claim 1, the at least one memory and the computer program code configured to, with the at least one processor, further cause the at least one processor to:
receive a new audit program and a batch data task identifier associated with the batch data task; and
record the new audit program such that the new audit program is associated with the batch data task;
wherein initiating at least one audit program associated with the batch data task includes initiating the new audit program.

9. A computerized method for auditing batch data tasks in a data warehouse, the method comprising:
detecting, by a processor, a failure status indicator associated with a batch data task in a task status log associated with the data warehouse;
based on detecting the failure status indicator of the batch data task, polling, by the processor, the task status log for a recovery status indicator associated with the batch data task;
based on detecting the recovery status indicator associated with the batch data task during the polling of the task status log, initiating, by the processor, at least one audit program associated with the batch data task;
receiving, by the processor, at least one audit result from the at least one audit program;
based on the received at least one audit result, providing, by the processor, at least one audit result indicator, the at least one audit result indicator including an indication that a recovery of the batch data task has succeeded; and
upon the at least one audit result indicator including the indication that the recovery has succeeded, automatically performing a validation of the recovery of the batch data task, performing the validation including identifying input data for the batch data task, determining expected data, the expected data being data that would be produced upon the batch data task being correctly performed on the input data, comparing the expected data with output data, and validating the recovery upon the output data matching the expected data.

10. The computerized method of claim 9, wherein detecting the failure status indicator includes polling the task status log for a failure status indicator periodically based on a defined failure status poll interval; and
wherein polling the task status log for a recovery status indicator includes polling the task status log for a recovery status indicator periodically based on a defined recovery status poll interval.

11. The computerized method of claim 10, further comprising:
storing failure status indicators and associated audit results of a plurality of batch data tasks; and
adjusting at least one of the failure status poll interval and the recovery status poll interval based on an application of at least one machine learning rule to the stored failure status indicators and associated audit results.

12. The computerized method of claim 9, wherein providing the at least one audit result indicator includes determining a contact method of a responsible party associated with the batch data task and providing the at least one audit result indicator to the responsible party using the determined contact method.

13. The computerized method of claim 9, wherein performing the validation includes one or more of: determining a data corruption after the recovery and verifying an accuracy of records associated with the batch data task in the data warehouse after the recovery.

14. The computerized method of claim 9, wherein verifying the accuracy of records associated with the batch data task in the data warehouse after the recovery includes determining, based on accessing input data, specific data values in the data warehouse that should be affected by the batch data task, and confirming that the specific data values in the data warehouse have been affected.

15. The computerized method of claim 14, further comprising:
  analyzing data of the task audit data store;
  generating task audit metrics based on the analysis of the data of the task audit data store, the task audit metrics including at least one of a task failure rate and a task recovery failure rate associated with a subset of batch data tasks of the data warehouse;
  wherein the generated task audit metrics are included in a task audit report.

16. The computerized method of claim 9, further comprising:
  receiving a new audit program and a batch data task identifier associated with the batch data task; and
  recording the new audit program such that the new audit program is associated with the batch data task;
  wherein initiating at least one audit program associated with the batch data task includes initiating the new audit program.

17. One or more computer storage media having computer-executable instructions for auditing batch data tasks in a data warehouse that, upon execution by a processor, cause the processor to at least:
  detect a failure status indicator associated with a batch data task in a task status log associated with the data warehouse;
  based on detecting the failure status indicator of the batch data task, poll the task status log for a recovery status indicator associated with the batch data task;
  based on detecting the recovery status indicator associated with the batch data task during the polling of the task status log, initiate at least one audit program associated with the batch data task;
  receive at least one audit result from the at least one audit program;
  based on the received at least one audit result, provide at least one audit result indicator, the at least one audit result indicator an indication that a recovery of the batch data task has succeeded; and
  upon the at least one audit result indicator including the indication that the recovery has succeeded, automatically perform a validation of the recovery of the batch data task, performing the validation including identifying input data for the batch data task, determining expected data, the expected data being data that would be produced upon the batch data task being correctly performed on the input data, comparing the expected data with output data, and validating the recovery upon the output data matching the expected data.

18. The one or more computer storage media of claim 17, wherein detecting the failure status indicator includes polling the task status log for a failure status indicator periodically based on a defined failure status poll interval; and
  wherein polling the task status log for a recovery status indicator includes polling the task status log for a recovery status indicator periodically based on a defined recovery status poll interval.

19. The one or more computer storage media of claim 18, wherein the computer-executable instructions, upon execution by a processor, further cause the processor to at least:
  store failure status indicators and associated audit results of a plurality of batch data tasks; and
  adjust at least one of the failure status poll interval and the recovery status poll interval based on an application of at least one machine learning rule to the stored failure status indicators and associated audit results.

20. The one or more computer storage media of claim 17, wherein performing the validation includes one or more of: determining a data corruption after the recovery and verifying an accuracy of records associated with the batch data task in the data warehouse after the recovery.

* * * * *